United States Patent
Karst

(10) Patent No.: US 11,427,248 B2
(45) Date of Patent: Aug. 30, 2022

(54) REAR STEERING HYDRAULIC SYSTEM

(71) Applicant: DEERE & COMPANY, Moline, IL (US)

(72) Inventor: Austin J. Karst, Ottumwa, IA (US)

(73) Assignee: DEERE & COMPANY, Moline, IL (US)

(\*) Notice: Subject to any disclaimer, the term of this patent is extended or adjusted under 35 U.S.C. 154(b) by 149 days.

(21) Appl. No.: 16/860,543

(22) Filed: Apr. 28, 2020

(65) Prior Publication Data

US 2021/0331741 A1 Oct. 28, 2021

(51) Int. Cl.
*B62D 7/15* (2006.01)
*B62D 7/14* (2006.01)

(52) U.S. Cl.
CPC ........... *B62D 7/1572* (2013.01); *B62D 7/144* (2013.01)

(58) Field of Classification Search
CPC ........ A01B 69/007; B60B 33/00; B62D 5/08; B62D 5/09; B62D 5/091; B62D 11/005; B62D 7/1572
See application file for complete search history.

(56) References Cited

U.S. PATENT DOCUMENTS

| | | | |
|---|---|---|---|
| 7,077,220 B2 | 7/2006 | Dunn et al. | |
| 8,496,256 B2 | 7/2013 | Bebernes et al. | |
| 8,925,672 B2 | 1/2015 | Bebernes et al. | |
| 9,370,138 B2\* | 6/2016 | Bebernes | B62D 5/08 |
| 9,421,999 B2\* | 8/2016 | Rotole | B62D 5/08 |
| 9,439,341 B2\* | 9/2016 | Bebernes | A01B 69/007 |
| 9,744,986 B2 | 8/2017 | Young et al. | |
| 10,661,831 B2\* | 5/2020 | Rotole | B62D 5/09 |
| 2019/0124820 A1\* | 5/2019 | Dockter | A01B 69/007 |
| 2021/0329824 A1\* | 10/2021 | Karst | F15B 11/20 |
| 2021/0331738 A1\* | 10/2021 | Rotole | B62D 5/063 |

\* cited by examiner

*Primary Examiner* — James A English

(57) ABSTRACT

A hydraulic system for controlling a pair of steerable caster wheels of an agricultural machine includes a fluidic tie rod fluid circuit interconnecting both a left side actuator and a right side actuator with a rear steering control valve in fluid communication, and forming a fluid tie rod between the left side actuator and the right side actuator. A tie rod control valve is disposed in the fluidic tie rod fluid circuit and is controllable between a first position allowing fluid communication through the fluidic tie rod fluid circuit to communicate fluid between the left side actuator, the right side actuator, and the rear steering control valve and a second position blocking fluid communication to the rear steering control valve while connecting the left side actuator and the right side actuator in fluid communication to increase stiffness of the fluid tie rod therebetween.

17 Claims, 6 Drawing Sheets

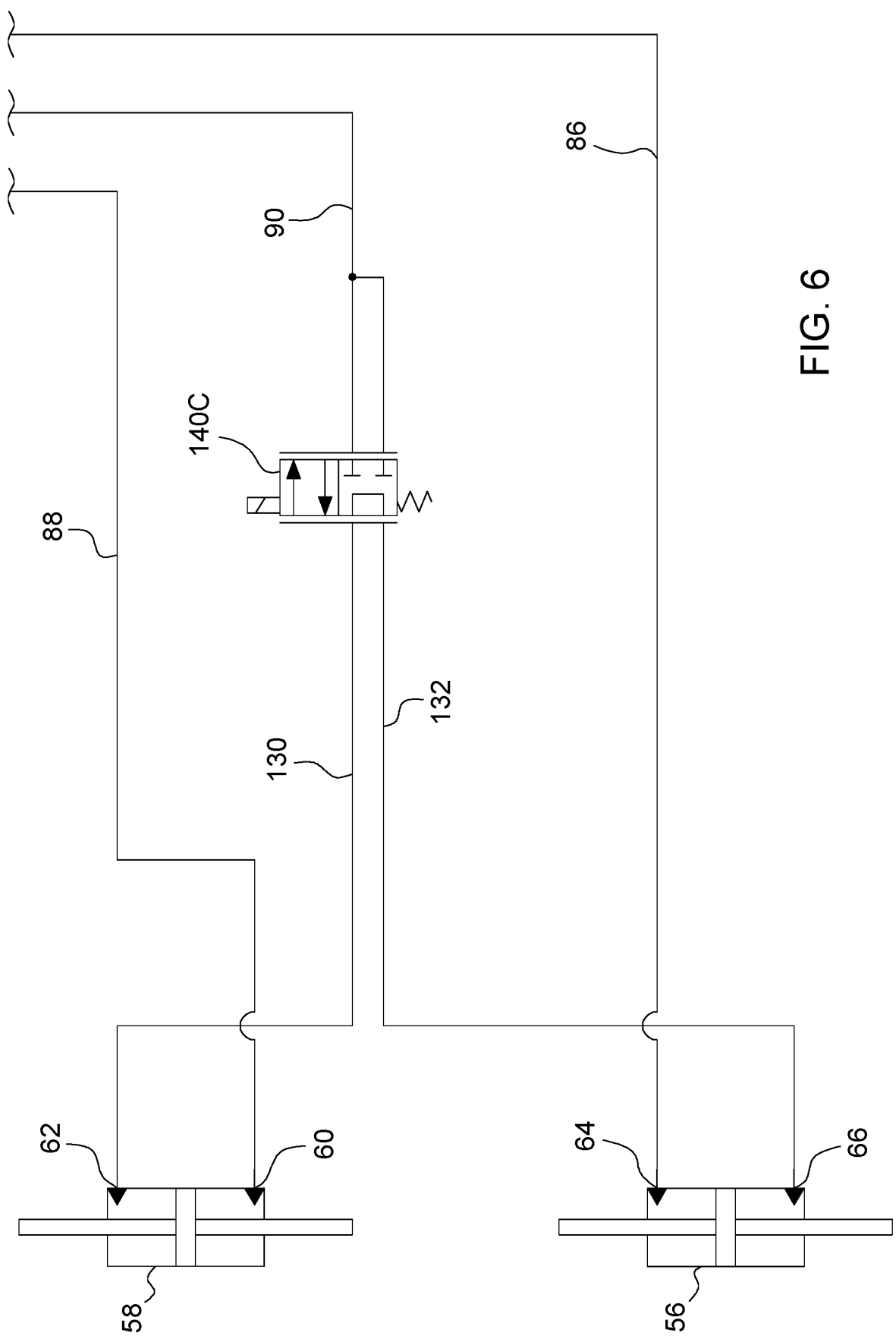

REAR STEERING HYDRAULIC SYSTEM

TECHNICAL FIELD

The disclosure generally relates to a hydraulic system for controlling a pair of steerable rear caster wheels of an agricultural machine.

BACKGROUND

Some agricultural machines, such as but not limited to self-propelled windrowers, are driven through a dual-path hydrostatic system. Speed changes are made by adjusting the speed of both front drive wheels simultaneously. Primary steering or direction changes are made by adjusting the relative speed of the front drive wheels. The rear wheels of such machines may be caster wheels to allow the machine to pivot during direction changes.

Caster wheels are typically carried by a frame of the vehicle, and are free to rotate about a generally vertical axis three hundred sixty degrees (360°). The caster wheel assembly typically includes a shaft defining an axis of rotation, a fork rigidly attached to the bottom end of the shaft, and a caster wheel coupled with the distal ends of the fork.

In order to improve steerability of such vehicles, the vehicle may be equipped with a steering system for controlling the rear caster wheels. For example, the vehicle may be equipped with a hydraulic system that actuates hydraulic cylinders to control the position of the rear caster wheels relative to their respective vertical axis about which they rotate. In order to maintain the versatility of the rear steering system of such vehicles, the rear caster wheels should be capable of rotating independently of each other in certain circumstances, such as for example, when reversing directions and/or in response to a significant lateral force.

SUMMARY

A hydraulic system for controlling a pair of steerable caster wheels of an agricultural machine is provided. The hydraulic system includes a left side actuator and a right side actuator. The left side actuator is configured to control a left caster wheel, whereas the right side actuator is configured to control a right caster wheel. The hydraulic system further includes a rear steering control valve. A left side steering fluid circuit is disposed in fluid communication with the left side actuator. A right side steering fluid circuit is disposed in fluid communication with the right side actuator. A fluidic tie rod fluid circuit interconnects both the left side actuator and the right side actuator with the rear steering control valve in fluid communication. A tie rod control valve is disposed in the fluidic tie rod fluid circuit. The tie rod control valve is controllable between a first position and a second position. When disposed in the first position, the tie rod control valve allows fluid communication through the fluidic tie rod fluid circuit to communicate fluid between the left side actuator, the right side actuator, and the rear steering control valve. When disposed in the second position, the tie rod control valve blocks fluid communication to the rear steering control valve while connecting the left side actuator and the right side actuator in fluid communication.

In one aspect of the disclosure, the tie rod control valve is positioned proximate to both the right side actuator and the left side actuator. By positioning the tie rod control valve proximate, i.e., near, the right side actuator and the left side actuator, the fluid volume contained within the fluidic tie rod fluid circuit interconnecting the left side actuator and the right side actuator, when the tie rod control valve is disposed in the second position, is reduced, thereby increasing the stiffness and/or responsiveness of the fluid tie rod interconnecting left side actuator and the right side actuator. As such, in one aspect of the disclosure, the tie rod control valve is operable to reduce a fluid volume in the fluidic tie rod fluid circuit disposed between the left side actuator and the right side actuator, when the tie rod control valve is disposed in the second position, to increase stiffness of the fluid tie rod formed by the fluidic tie rod fluid circuit.

In one aspect of the disclosure, the fluidic tie rod fluid circuit defines a circuit volume having an actuator side volume disposed between the left side actuator, the right side actuator, and the tie rod control valve, and a tank side volume disposed between the tie rod control valve and the rear steering control valve. The actuator side volume is less than the tank side volume.

In one aspect of the disclosure, the tie rod control valve may be normally biased into the first position. The tie rod control valve may be biased by a spring or other similar device. The tie rod control valve may include a hydraulically actuated pilot signal to move the tie rod control valve from its normal first position into the second position.

In one implementation of the disclosure, the tie rod control valve is moveable between the first position and the second position in response to a fluid pressure in one of the right side steering fluid circuit or the left side steering fluid circuit. The hydraulic system may include a tie rod control circuit having a first portion and a second portion. The first portion of the tie rod control circuit interconnects the right side steering fluid circuit and the tie rod control valve in fluid communication. The second portion of the tie rod control circuit interconnects the left side steering fluid circuit and the tie rod control valve in fluid communication. The tie rod control circuit and/or the tie rod control valve may include a two way check valve interconnecting both the first portion and the second portion of the tie rod control circuit with the tie rod control valve. In one aspect of the disclosure, a flow restriction, such as but not limited to an orifice restriction, may be positioned within the tie rod control circuit, e.g., the first portion and/or the second portion, to control movement of the tie rod control valve between the first position and the second position.

In another implementation of the disclosure, the tie rod control valve is moveable between the first position and the second position in response to a fluid pressure in the fluidic tie rod fluid circuit between the left side actuator, the right side actuator, and the tie rod control valve. The hydraulic system may include a tie rod control circuit interconnecting the tie rod control valve with the fluidic tie rod fluid circuit at a location disposed between the left side actuator or the right side actuator and the tie rod control valve. In one aspect of the disclosure, the tie rod control circuit may include a flow restriction, such as but not limited to an orifice restriction, disposed within the tie rod control circuit, to control movement of the tie rod control valve between the first position and the second position.

In one implementation of the disclosure, the tie rod control valve may include an electrically actuated control valve. The electrically actuated control valve may include an electrically actuated proportional control valve. The electrically actuated proportional control valve may be controlled to control the movement of the tie rod control valve between the first position and the second position.

The above features and advantages and other features and advantages of the present teachings are readily apparent

BRIEF DESCRIPTION OF THE DRAWINGS

FIG. 6 is a schematic layout of the hydraulic system showing a third implementation of the tie rod control valve.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "substantially" or "approximately" are understood by those of ordinary skill to refer to reasonable ranges outside of the given value, for example, general tolerances associated with manufacturing, assembly, and use of the described implementations.

Figure 1:
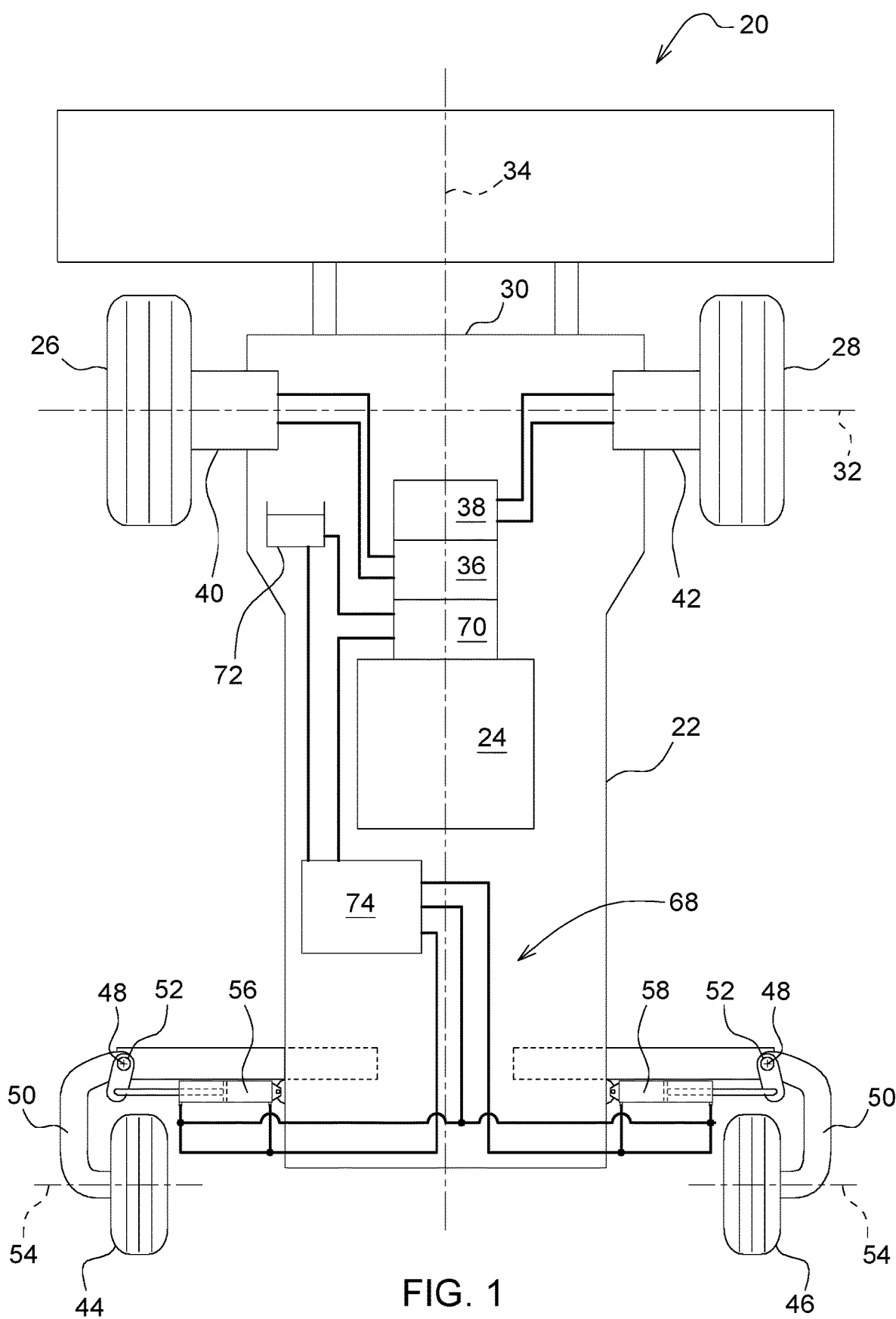
FIG. 1 is a schematic plan view of an agricultural machine.

Referring to the Figures, wherein like numerals indicate like parts throughout the several views, an agricultural machine is generally shown at 20 in FIG. 1. The example implementation of the agricultural machine 20 shown in FIG. 1 includes, but is not limited to, a self-propelled windrower. However, it should be appreciated that the teachings of this disclosure may be applied to machines other than the example windrower depicted in FIG. 1.

Referring to FIG. 1, the agricultural machine 20 includes a frame 22, which supports a prime mover 24. The prime mover 24 may include, but is not limited to, an internal combustion engine, an electric motor, a combination of both, or some other device capable of generating torque to power the agricultural machine 20. A left front drive wheel 26 and a right front drive wheel 28 are each mounted to the frame 22, adjacent a forward end 30 of the frame 22. The left front drive wheel 26 and the right front drive wheel 28 are rotatable about a transverse axis 32. The transverse axis 32 is generally perpendicular to a longitudinal axis 34 of the frame 22.

A first drive pump 36 and a second drive pump 38 are coupled to and driven by the prime mover 24. The first drive pump 36 supplies pressurized fluid to a first hydraulic motor 40. The first hydraulic motor 40 is coupled to the left front drive wheel 26 and operable to rotate the left front drive wheel 26 to propel the agricultural machine 20. The second drive pump 38 supplies pressurized fluid to a second hydraulic motor 42. The second hydraulic motor 42 is coupled to the right front drive wheel 28 and operable to rotate the right front drive wheel 28 to propel the agricultural machine 20.

As understood by those skilled in the art, the left front drive wheel 26 and the right front drive wheel 28 may be simultaneously rotated in the same rotational direction and at the same rotational speed about the transverse axis 32 to drive the agricultural machine 20 forward or rearward, depending upon the direction of rotation. Additionally, the left front drive wheel 26 and the right front drive wheel 28 may be rotated in the same rotational direction at different rotational speeds about the transverse axis 32, or in opposite rotational directions at the same or different rotational speeds about the transverse axis 32, in order to turn the agricultural vehicle.

Figure 2:
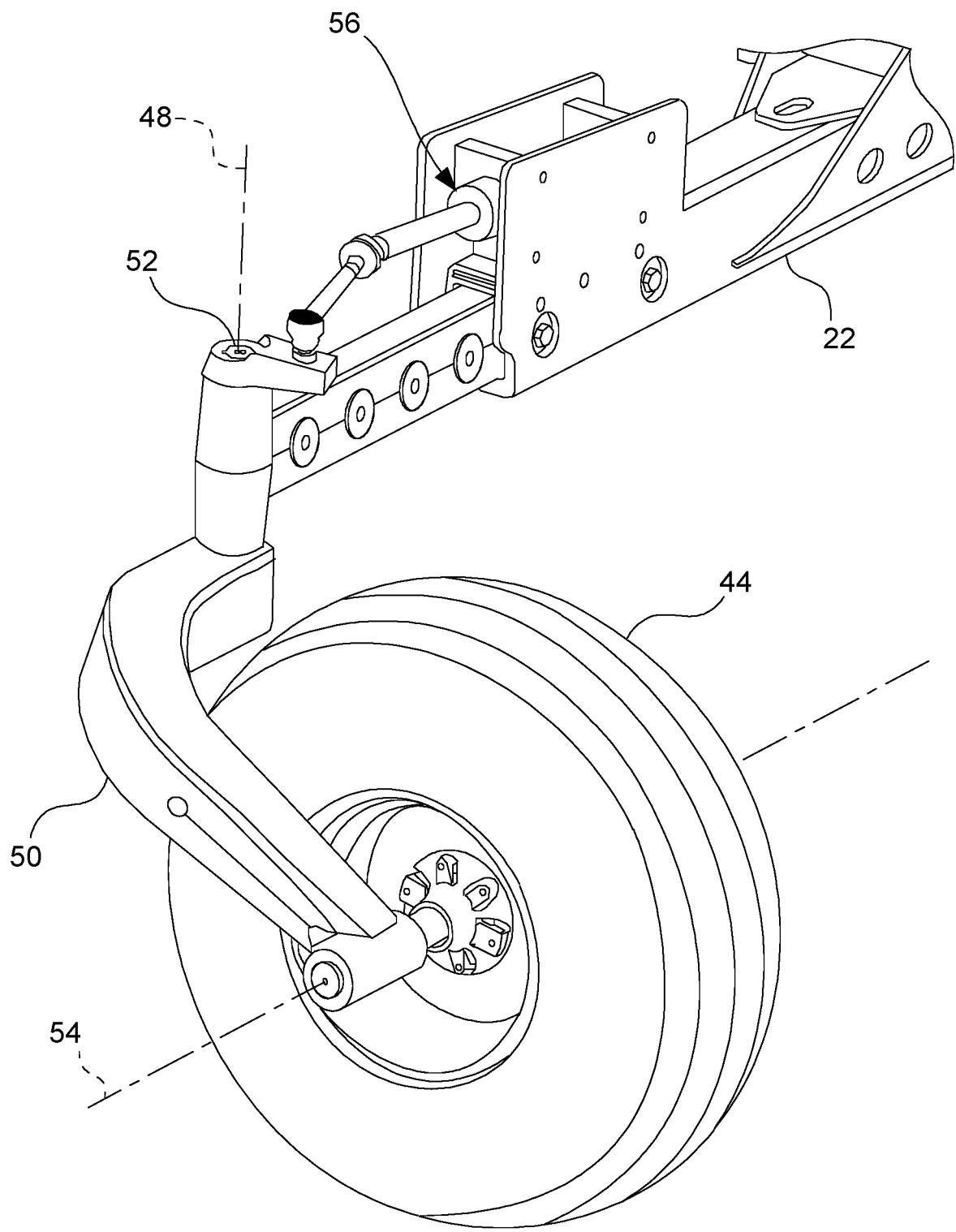
FIG. 2 is a schematic perspective view of a rear caster wheel of the agricultural machine.

Referring to FIGS. 1 and 2, the agricultural machine 20 further includes a left rear caster wheel 44 and a right rear caster wheel 46 attached to the frame 22. As used herein, the term "caster wheel" should be understood to include a wheel that is able to rotate a full three hundred sixty degrees (360°) about a respective generally vertical axis 48. As such, each of the left rear caster wheel 44 and the right rear caster wheel 46 are rotatable a full three hundred sixty degrees (360°) about a respective generally vertical axis 48. The left rear caster wheel 44 and the right rear caster wheel 46 may be attached to the frame 22 in a suitable manner. For example, as shown in FIG. 2, the caster wheels may be attached to the frame 22 via an arm 50. The arm 50 includes an upper shaft 52 that is rotatable about the generally vertical axis 48. The caster wheel is attached to lower distal end of the arm 50. Typically, a generally horizontal axis 54 of rotation of the wheel is longitudinally offset from the generally vertical axis 48, such that the caster wheel tends to follow behind the generally vertical axis 48. It should be appreciated that the right rear caster wheel 46 and the left rear caster wheel 44 may be attached to the frame 22 in some other manner than described herein.

A left side actuator 56 interconnects the left rear caster wheel 44 and the frame 22, and is configured to control a position of the left rear caster wheel 44. Similarly, a right side actuator 58 interconnects the right rear caster wheel 46 and the frame 22, and is configured to control a position of the right rear caster wheel 46. In the example implementation shown in FIG. 1 and described herein, each of the right side actuator 58 and the left side actuator 58 include a double acting hydraulic cylinder. As such, the right side actuator 58 includes an inboard fluid port 60 and an outboard fluid port 62 for receiving and/or discharging hydraulic fluid. Similarly, the left side actuator 58 includes an inboard fluid port 64 and an outboard fluid port 66 for receiving and/or discharging hydraulic fluid.

The agricultural machine 20 includes a hydraulic system 68 for controlling the pair of steerable caster wheels, i.e., the left rear caster wheel 44 and the right rear caster wheel 46. While the left front drive wheel 26 and the right front drive wheel 28 provide the primary steering for the agricultural machine 20, the left rear caster wheel 44 and the right rear caster wheel 46 may be controlled to provide a steering assist and/or improve steering responsiveness under certain operating conditions. The hydraulic system connects the left side actuator 56 and the right side actuator 58 to provide a fluid tie rod therebetween. In other words, under certain operating conditions, the operation of the left rear caster wheel 44 and the right rear caster wheel 46 may be coupled together to provide a steering force to the agricultural machine 20, while in other operating conditions, the operation of the left rear caster wheel 44 and the right rear caster wheel 46 may be de-coupled to provide independent operation. Additionally, the hydraulic system 68 allows hydraulic forces applied to the left side actuator 56 and the right side actuator 58 to be overcome or overridden by forces applied to the left rear caster wheel 44 and the right rear caster wheel 46 by the ground.

The hydraulic system 68 includes a pressure source 70 configured to supply a flow of pressurized fluid. The pressure source 70 may include, but is not limited to, an auxiliary fluid pump that is drivenly coupled to the prime mover 24. The pressure source 70 draws fluid from a tank 72, and circulates the fluid through the hydraulic system 68. The tank 72 receives the fluid from the hydraulic system 68, stores the fluid, and supplies the fluid to the pressure source 70, e.g., an auxiliary fluid pump shown in FIG. 1.

Figure 3:
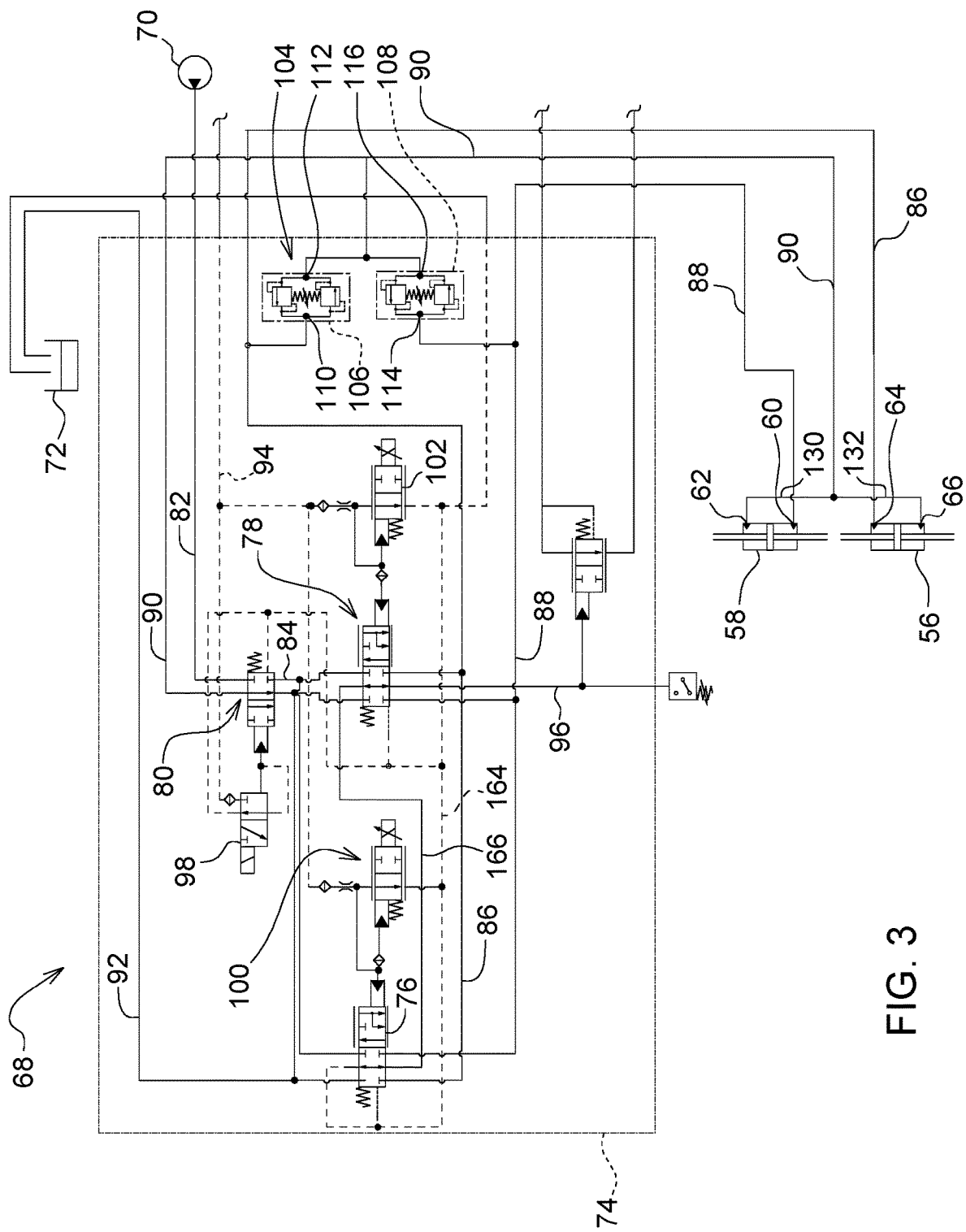
FIG. 3 is a schematic layout of a hydraulic system of the agricultural machine.

Referring to FIG. 3, the hydraulic system 68 is shown schematically using standard American National Standards Institute (ANSI) hydraulic symbols to represent the various components of the example hydraulic system 68 therein. The hydraulic system 68 includes the pressure source 70 and the tank 72 described above, in combination with a valve block 74 and a plurality of fluid circuits described in greater detail below. It should be appreciated that the various fluid circuits described herein are defined fluid pathways or passages defined by the valve block 74, hard lines, flexible lines, fittings, connections, etc., that connect the various components and direct the fluid between components.

The valve block 74 includes a left steering command valve 76, a right steering command valve 78, and a rear steering control valve 80. A supply pressure fluid circuit 82 interconnects the pressure source 70 and the rear steering control valve 80 in fluid communication. A command valve supply fluid circuit 84 interconnects the rear steering control valve 80 with both the right steering command valve 78 and the left steering command valve 76 in fluid communication. A left side steering fluid circuit 86 interconnects the left side actuator 56 and the left steering command valve 76 in fluid communication. A right side steering fluid circuit 88 interconnects the right side actuator 58 and the right steering command valve 78 in fluid communication. A fluidic tie rod fluid circuit 90 interconnects both the left side actuator 56 and the right side actuator 58 with the rear steering control valve 80 in fluid communication. A tank return fluid circuit 92 interconnects the rear steering control valve 80, the left steering command valve 76, the right steering command valve 78, and the tank 72 in fluid communication. A cross-valve fluid circuit 166 interconnects the left steering command valve 76 and the right steering command valve 78 in fluid communication. A pilot supply fluid circuit 94 is disposed in fluid communication with the left steering command valve 76, the right steering command valve 78, and the rear steering control valve 80. A pilot return fluid circuit 164 is disposed in fluid communication with the left steering command valve 76, the right steering command valve 78, the rear steering control valve 80, and the tank 72. A pressure sensor fluid circuit 96 is disposed in fluid communication with the right steering command valve 78.

The rear steering control valve 80 is controllable between a first state and a second state. When the rear steering control valve 80 is disposed in the first state, the fluidic tie rod fluid circuit 90 and the tank return fluid circuit 92 are connected in fluid communication and the supply pressure fluid circuit 82 and the command valve supply fluid circuit 84 are disconnected from fluid communication. When the rear steering control valve 80 is disposed in the second state the fluidic tie rod fluid circuit 90 and the tank return fluid circuit 92 are disconnected from fluid communication and the supply pressure fluid circuit 82 and the command valve supply fluid circuit 84 are connected in fluid communication. The rear steering control valve 80 is normally disposed in the first state and is controlled into the second state in response to an activation signal. The activation signal causes the rear steering control valve 80 to move from the first state to the second state. In the absence of the activation signal, the rear steering control valve 80 returns to and/or maintains its position in the first state.

The activation signal for the rear steering control valve 80 may include an input that is capable of moving the rear steering control valve 80 from the first state into the second state. For example, the activation signal for the rear steering control valve 80 may include, but is not limited to, a fluid signal, a pneumatic signal, an electronic signal, a mechanical signal, etc. In the example implementation shown in FIG. 3, the rear steering control valve 80 is a pilot actuated position control valve, in which a dedicated pilot valve 98 is disposed in fluid communication with the pilot supply fluid circuit 94 and is operable in response to an electronic signal to provide a hydraulic activation signal to the rear steering control valve 80 to move the rear steering control valve 80 from its first position to its second position. It should be appreciated that the rear steering control valve 80 and the manner of actuating the rear steering control valve 80 may differ from the example implementation depicted in FIG. 3 and described herein.

As shown in the example implementation of FIG. 3, the left steering command valve 76 may include a pilot actuated variable directional control valve. The left steering command valve 76 is moveable between a first state, a second state, and a plurality of positions between the first state and the second state. When the left steering command valve 76 is disposed in the first state, the left steering command valve 76 is configured to disconnect fluid communication between the left side steering fluid circuit 86 and the tank return fluid circuit 92, connect fluid communication between the pilot return fluid circuit 164 and the cross-valve fluid circuit 166, and disconnect fluid communication between the command valve supply fluid circuit 84 and the right side steering fluid circuit 88. When the left steering command valve 76 is disposed in the second state, the left steering command valve 76 is configured to connect fluid communication between the left side steering fluid circuit 86 and the tank return fluid circuit 92, close fluid communication to the pilot return fluid circuit 164, and connect fluid communication between the command valve supply fluid circuit 84 with both the right side steering fluid circuit 88 and the cross-valve fluid circuit 166. The left steering command valve 76 is normally disposed in the first state and is controlled into the second state or a position between the first state and the second state in response to a variable activation signal. The variable activation signal causes the left steering command valve 76 to move from the first state into the second state or to a desired position between the first state and the second state. In the absence of the activation signal, the left steering command valve 76 returns to and/or maintains its position in the first state.

The variable activation signal for the left steering command valve 76 may include an input that is capable of moving the left steering command valve 76 from the first state into the second state or to a position between the first state and the second state. For example, the variable activation signal for the left steering command valve 76 may include, but is not limited to, a variable fluid signal, a variable pneumatic signal, a variable electronic signal, a variable mechanical signal, etc. In the example implementation shown in FIG. 3, the left steering command valve 76 is a variable pilot actuated variable position control valve, in which a dedicated variable pilot valve 100 is disposed in fluid communication with the pilot supply fluid circuit 94 and is operable in response to an electronic signal to provide a variable hydraulic activation signal to the left steering command valve 76 to move the left steering command valve 76 from its first position to its second position or a position between its first position and its second position. It should be appreciated that the left steering command valve 76 and the manner of actuating the left steering command valve 76 may differ from the example implementation depicted in FIG. 3 and described herein.

As shown in the example implementation of FIG. 3, the right steering command valve 78 may include a pilot actuated variable directional control valve. The right steering command valve 78 is moveable between a first state, a second state, and a plurality of positions between the first state and the second state. When the right steering command valve 78 is disposed in the first state, the right steering command valve 78 is configured to disconnect fluid communication between the right side steering fluid circuit 88 and the tank return fluid circuit 92, connect fluid communication between the cross-valve fluid circuit 166 and the pressure sensor fluid circuit 96, and disconnect fluid communication between the command valve supply fluid circuit 84 and the left side steering fluid circuit 86. When the right steering command valve 78 is disposed in the second state, the right steering command valve 78 is configured to connect fluid communication between the right side steering fluid circuit 88 and the tank return fluid circuit 92, disconnect fluid communication to the cross-valve fluid circuit 166, and connect fluid communication between the command valve supply fluid circuit 84 and both the left side steering fluid circuit 86 and the pressure sensor fluid circuit 96. The right steering command valve 78 is normally disposed in the first state and is controlled into the second state or a position between the first state and the second state in response to a variable activation signal. The variable activation signal causes the right steering command valve 78 to move from the first state into the second state or to a desired position between the first state and the second state. In the absence of the activation signal, the right steering command valve 78 returns to and/or maintains its position in the first state.

The variable activation signal for the right steering command valve 78 may include an input that is capable of moving the right steering command valve 78 from the first state into the second state or to a position between the first state and the second state. For example, the variable activation signal for the right steering command valve 78 may include, but is not limited to, a variable fluid signal, a variable pneumatic signal, a variable electronic signal, a variable mechanical signal, etc. In the example implementation shown in FIG. 3, the right steering command valve 78 is a variable pilot actuated variable position control valve, in which a dedicated variable pilot valve 102 is disposed in fluid communication with the pilot supply fluid circuit 94 and is operable in response to an electronic signal to provide a variable hydraulic activation signal to the right steering command valve 78 to move the right steering command valve 78 from its first position to its second position or a position between its first position and its second position. It should be appreciated that the right steering command valve 78 and the manner of actuating the right steering command valve 78 may differ from the example implementation depicted in FIG. 3 and described herein.

The hydraulic system 68 further includes a cross port pressure relief system 104 that interconnects the left side steering fluid circuit 86, the right side steering fluid circuit 88, and the fluidic tie rod fluid circuit 90 in fluid communication. As shown in the example implementation of FIG. 3, the cross port pressure relief system 104 includes a left side pressure relief valve 106 and a right side pressure relief valve 108. The left side pressure relief valve 106 includes a first port 110 connected in fluid communication to the left side steering fluid circuit 86, and a second port 112 connected in fluid communication to the fluidic tie rod fluid circuit 90. The right side pressure relief valve 108 includes a first port 114 connected in fluid communication to the right side steering fluid circuit 88, and a second port 116 connected in fluid communication to the fluidic tie rod fluid circuit 90. The second port 112 of the left side pressure relief valve 106 and the second port 116 of the right side pressure relief valve 108 are both connected in fluid communication to each other, and to the fluidic tie rod fluid circuit 90. In the example shown in FIG. 3, the left side pressure relief valve 106 and the right side pressure relief valve 108 are disposed in the valve block 74. However, in other implementations, the left side pressure relief valve 106 and the right side pressure relief valve 108 may be disposed in another or different valve body.

The left side pressure relief valve 106 and the right side pressure relief valve 108 provide two-way pressure relief. In other words, regardless of which direction the fluid pressure is applied from, i.e., from the first ports 110, 114 to the second ports 112, 116 respectively or from the second ports 112, 116 to the first ports 110, 114 respectively, the left side pressure relief valve 106 and the right side pressure relief valve 108 are configured to allow fluid communication when the applied fluid pressure is greater than a defined limit.

The left side steering fluid circuit 86 is in fluid communication with the inboard fluid port 64 of the left side actuator 56. A left side line 132 is connected to the outboard fluid port 66 of the left side actuator 56. The right side steering fluid circuit 88 is in fluid communication with the inboard fluid port 60 of the right side actuator 58. A right side line 130 is connected to the outboard fluid port 62 of the right side actuator 58. The right side line 130 and the left side line 132 are connected in fluid communication to the fluidic tie rod fluid circuit 90.

As described above, the hydraulic system 68 includes the fluidic tie rod fluid circuit 90 that interconnect both the left side actuator 56 and the right side actuator 58 with the rear steering control valve 80 in fluid communication. The fluidic tie rod fluid circuit 90 forms a fluid tie rod that interconnects the left side actuator 56 and the right side actuator 58. The fluidic tie rod fluid circuit 90 connects the fluid tie rod to the rear steering control valve 80, which may be controlled to close off the fluidic tie rod fluid circuit 90, or to open the fluidic tie rod fluid circuit 90 to the tank 72. As described above, the left side actuator 56 and the right side actuator 58 control the rear caster wheels 44, 46 of the agricultural machine 20, and are therefore located near the rearward end of the agricultural machine 20. In instances where the rear steering control valve 80 is located toward the forward end 30 of the agricultural machine 20, the fluidic tie rod fluid circuit 90 may become lengthy. In instances where the fluidic tie rod fluid circuit 90 is both lengthy and defined by flexible hoses, the fluidic tie rod fluid circuit 90 may tend to function as an accumulator and reduce the stiffness and/or responsiveness of the fluid tie rod.

Figure 4:
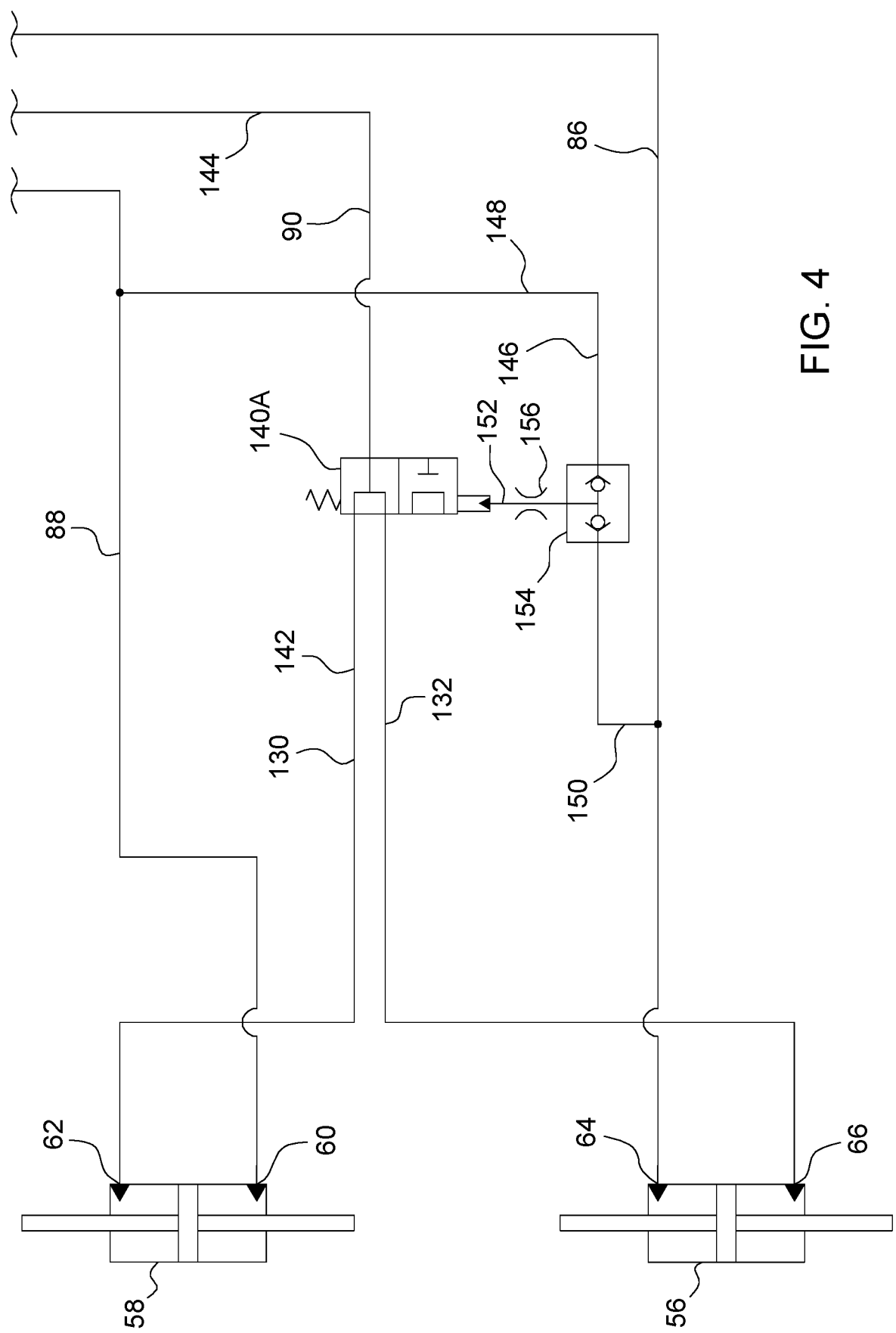
FIG. 4 is a schematic layout of the hydraulic system showing a first implementation of a tie rod control valve disposed proximate a left side actuator and a right side actuator.
Figure 5:
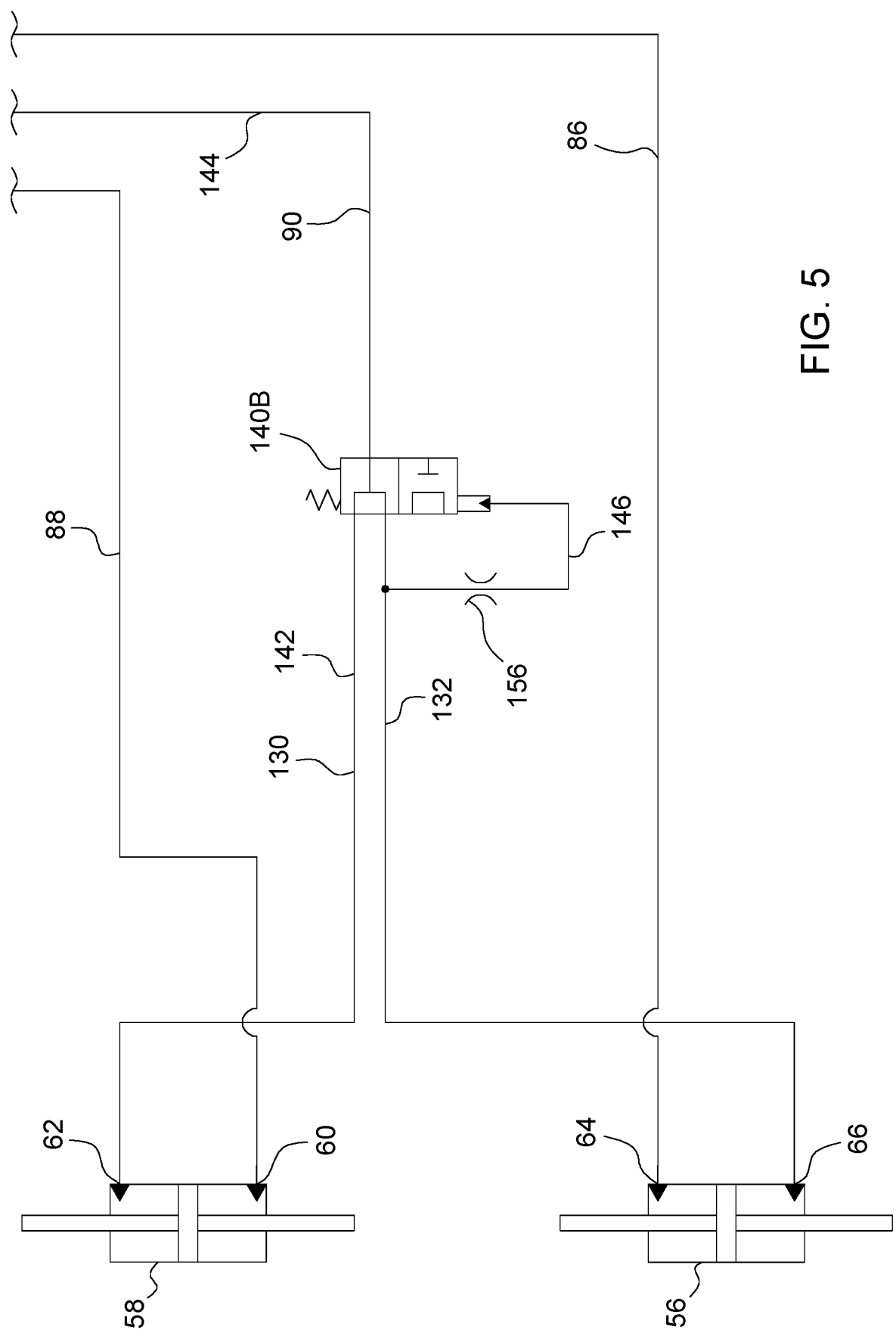
FIG. 5 is a schematic layout of the hydraulic system showing a second implementation of the tie rod control valve.

In order to increase the stiffness and/or responsiveness of the fluid tie rod, the hydraulic system 68 may include a tie rod control valve 140A, 140B, 140C, such as shown in FIGS. 4-6. As shown in FIGS. 4-6, the tie rod control valve 140A, 140B, 140C is disposed in the fluidic tie rod fluid circuit 90. The tie rod control valve 140A, 140B, 140C is controllable between a first position and a second position. The second position of the tie rod control valve 140A, 140B, 140C is operable to increase stiffness in the fluid tie rod relative to a stiffness of the fluid tie rod when the tie rod control valve 140A, 140B, 140C is disposed in the first position. The first position of the tie rod control valve 140A, 140B, 140C allows fluid communication through the fluidic tie rod fluid circuit 90 to communicate fluid between the left side actuator 56, the right side actuator 58, and the rear steering control valve 80. The second position of the tie rod control valve 140A, 140B, 140C blocks fluid communication to the rear steering control valve 80 while connecting the left side actuator 56 and the right side actuator 58 in fluid communication.

The fluidic tie rod fluid circuit 90 defines a circuit volume. The circuit volume is the fluid volume defined by the fluidic tie rod fluid circuit 90. The circuit volume includes an actuator side volume 142 and a tank side volume 144. The actuator side volume 142 is the fluid volume of the fluidic tie rod fluid circuit 90 that is disposed between the left side actuator 56, the right side actuator 58, and the tie rod control valve 140A, 140B, 140C. The tank side volume 144 is the fluid volume of the fluidic tie rod fluid circuit 90 that is disposed between the tie rod control valve 140A, 140B, 140C and the rear steering control valve 80. The tie rod control valve 140A, 140B, 140C may be positioned proximate or nearer to both the right side actuator 58 and the left side actuator 56, thereby minimizing the actuator side volume 142 of the fluidic tie rod fluid circuit 90. In one aspect of the disclosure, the actuator side volume 142 is less than the tank side volume 144. Reducing or minimizing the actuator side volume 142 increases the stiffness of the fluid tie rod formed by the fluidic tie rod fluid circuit 90 between the left side actuator 56 and the right side actuator 58.

The tie rod control valve 140A, 140B, 140C is normally biased into the first position, and is moveable into the second position in response to a control signal. The control signal may include, but is not limited to, a hydraulic control signal, a pneumatic control signal, an electrical control signal, etc. FIGS. 4-6 show different implementations of the tie rod control valve 140A, 140B, 140C.

Referring to FIG. 4, a first implementation of the tie rod control valve is generally shown at 140A. The tie rod control valve 140A is moveable between the first position and the second position in response to a fluid or hydraulic pressure in one of the right side steering fluid circuit 88 and/or the left side steering fluid circuit 86. As shown in FIG. 4, the tie rod control valve 140A includes a hydraulically actuated pilot, that is responsive to fluid pressure from either the right side steering fluid circuit 88 and/or the left side steering fluid circuit 86. The tie rod control valve 140A is normally biased into the first position and moves into the second position in response to the applied fluid pressure. As noted above, the first position allows fluid communication through the tie rod control valve 140A, and the second position blocks fluid communication through the tie rod control valve 140A and connects the left side line 132 and the right side line 130 of the fluidic tie rod fluid circuit 90 in fluid communication.

The hydraulic system 68 includes a tie rod control circuit 146 having a first portion 148, a second portion 150, and a third portion 152. The first portion 148 of the tie rod control circuit 146 interconnects the right side steering fluid circuit 88 and a two-way check valve 154 in fluid communication. The second portion 150 of the tie rod control circuit 146 interconnects the left side steering fluid circuit 86 and the two-way check valve 154 in fluid communication. The two-way check valve 154 interconnects both the first portion 148 and the second portion 150 of the tie rod control circuit 146 with the tie rod control valve 140A. As such, the third portion 152 of the tie rod control circuit 146 connects the two-way check valve 154 and the tie rod control valve 140A in fluid communication. With this configuration, fluid pressure from one of the right side steering fluid circuit 88 or the left side steering fluid circuit 86 may be used to actuate the tie rod control valve 140A, without affecting the other of the right side steering fluid circuit 88 or the left side steering fluid circuit 86.

A flow restriction 156 may be disposed in the tie rod control circuit 146. The flow restriction 156 may be disposed in either the first portion 148, the second portion 150, or the third portion 152 of the tie rod fluid circuit. For example, with reference to FIG. 4, the flow restriction 156 is disposed in the third portion 152 of the tie rod fluid circuit. However, it should be appreciated, for example, that the flow restriction 156 may be disposed in both the first portion 148 and the second portion 150 of the tie rod fluid circuit to achieve the same function.

The flow restriction 156 may include, but is not limited to, an orifice restriction or some other similar device. Additionally, the flow restriction 156 may be fixed, or variable. For example, the flow restriction 156 may be electronically controllable or variable to adjust the flow rate therethrough. The flow restriction 156 restricts or limits fluid flow to the hydraulic pilot of the tie rod control valve 140A to smooth or slow the movement of the tie rod control valve 140A from the first position to the second position, to smooth the transition of the responsiveness and/or stiffness of the fluid tie rod.

Referring to FIG. 5, a second implementation of the tie rod control valve is generally shown at 140B. The tie rod control valve 140B is moveable between the first position and the second position in response to a fluid or hydraulic pressure in the fluidic tie rod fluid circuit 90 at a location disposed between the left side actuator 56, the right side actuator 58, and the tie rod control valve 140B. As shown in FIG. 5, the tie rod control valve 140B includes a hydraulically actuated pilot, that is response to fluid pressure from the actuator side volume 142 of the fluidic tie rod fluid circuit 90. The tie rod control valve 140B is normally biased into the first position and moves into the second position in response to the applied fluid pressure. As noted above, the first position allows fluid communication through the tie rod control valve 140B, and the second position blocks fluid communication through the tie rod control valve 140B and connects the left side line 132 and the right side line 130 of the fluidic tie rod fluid circuit 90 in fluid communication.

The hydraulic system 68 includes a tie rod control circuit 146. The tie rod control circuit 146 interconnects the fluidic tie rod fluid circuit 90 and the tie rod control valve 140B in fluid communication. With this configuration, fluid pressure from either the right side line 130 or the left side line 132 of the fluidic tie rod fluid circuit 90 may actuate the tie rod control valve 140B.

A flow restriction 156 may be disposed in the tie rod control circuit 146. The flow restriction 156 may include, but is not limited to, an orifice restriction or some other similar device. Additionally, the flow restriction 156 may be fixed, or variable. For example, the flow restriction 156 may be electronically controllable or variable to adjust the flow rate therethrough. The flow restriction 156 restricts or limits fluid flow to the hydraulic pilot of the tie rod control valve 140B to smooth or slow the movement of the tie rod control valve 140B from the first position to the second position, to smooth the transition of the responsiveness and/or stiffness of the fluid tie rod.

Referring to FIG. 6, a third implementation of the tie rod control valve is generally shown at 140C. The tie rod control valve 140C is moveable between the first position and the second position in response to an electrical control signal. As such, the tie rod control valve 140C may be referred to as an electrically actuated solenoid control valve. In one implementation, the electrically actuated control valve is an electrically actuated proportional control valve, which may be controlled to multiple positions between the first position and the second position. By controlling the electrically actuated proportional control valve to multiple intermediate positions between the first position and the second position, the transition between the first position and the second position of the tie rod control valve 140C may be smoothed, thereby smoothing the transition of the responsiveness and/or stiffness of the fluid tie rod.

The detailed description and the drawings or figures are supportive and descriptive of the disclosure, but the scope of the disclosure is defined solely by the claims. While some of the best modes and other implementations for carrying out the claimed teachings have been described in detail, various alternative designs and implementations exist for practicing the disclosure defined in the appended claims.

The invention claimed is:

1. A hydraulic system for controlling a left caster wheel and a right caster wheel of an agricultural machine, the hydraulic system comprising:
 a left side actuator configured to control the left caster wheel;
 a right side actuator configured to control the right caster wheel;
 a rear steering control valve;
 a left side steering fluid circuit in fluid communication with the left side actuator;
 a right side steering fluid circuit in fluid communication with the right side actuator;
 a fluidic tie rod fluid circuit interconnecting both the left side actuator and the right side actuator with the rear steering control valve in fluid communication; and
 a tie rod control valve disposed in the fluidic tie rod fluid circuit and controllable between a first position allowing fluid communication through the fluidic tie rod fluid circuit to communicate fluid between the left side actuator, the right side actuator, and the rear steering control valve, and a second position blocking fluid communication to the rear steering control valve while connecting the left side actuator and the right side actuator in fluid communication.

2. The hydraulic system set forth in claim 1, wherein the tie rod control valve is positioned proximate to both the right side actuator and the left side actuator.

3. The hydraulic system set forth in claim 1, wherein the fluidic tie rod fluid circuit defines a circuit volume having an actuator side volume disposed between the left side actuator, the right side actuator, and the tie rod control valve, and a tank side volume disposed between the tie rod control valve and the rear steering control valve.

4. The hydraulic system set forth in claim 3, wherein the actuator side volume is less than the tank side volume.

5. The hydraulic system set forth in claim 1, wherein the tie rod control valve is normally biased into the first position.

6. The hydraulic system set forth in claim 1, wherein the tie rod control valve is moveable between the first position and the second position in response to a fluid pressure in one of the right side steering fluid circuit or the left side steering fluid circuit.

7. The hydraulic system set forth in claim 6, further comprising a tie rod control circuit having a first portion interconnecting the right side steering fluid circuit and the tie rod control valve in fluid communication, and a second portion interconnecting the left side steering fluid circuit and the tie rod control valve in fluid communication.

8. The hydraulic system set forth in claim 7, wherein the tie rod control valve includes a two way check valve interconnecting both the first portion and the second portion of the tie rod control circuit with the tie rod control valve.

9. The hydraulic system set forth in claim 7, further comprising a flow restriction disposed in the tie rod control circuit.

10. The hydraulic system set forth in claim 1, wherein the tie rod control valve is moveable between the first position and the second position in response to a fluid pressure in the fluidic tie rod fluid circuit between the left side actuator, the right side actuator, and the tie rod control valve.

11. The hydraulic system set forth in claim 10, further comprising a tie rod control circuit interconnecting the tie rod control valve with the fluidic tie rod fluid circuit at a location disposed between the left side actuator or the right side actuator and the tie rod control valve.

12. The hydraulic system set forth in claim 11, further comprising a flow restriction disposed in the tie rod control circuit.

13. The hydraulic system set forth in claim 1, wherein the tie rod control valve includes an electrically actuated control valve.

14. The hydraulic system set forth in claim 13, wherein the electrically actuated control valve is an electrically actuated proportional control valve.

15. A hydraulic system for controlling a left caster wheel and a right caster wheel of an agricultural machine, the hydraulic system comprising:
 a left side actuator configured to control the left caster wheel;
 a right side actuator configured to control the right caster wheel;
 a rear steering control valve;
 a left side steering fluid circuit in fluid communication with the left side actuator;
 a right side steering fluid circuit in fluid communication with the right side actuator;
 a fluidic tie rod fluid circuit interconnecting both the left side actuator and the right side actuator with the rear steering control valve in fluid communication, whereby a fluid tie rod is formed interconnecting the left side actuator and the right side actuator;
 a tie rod control valve disposed in the fluidic tie rod fluid circuit and controllable between a first position and a second position, wherein the second position of the tie rod control valve is operable to increase stiffness in the fluid tie rod relative to a stiffness of the fluid tie rod when the tie rod control valve is disposed in the first position; and
 wherein the first position of the tie rod control valve allows fluid communication through the fluidic tie rod fluid circuit to communicate fluid between the left side actuator, the right side actuator, and the rear steering control valve, and wherein the second position of the tie rod control valve blocks fluid communication to the rear steering control valve while connecting the left side actuator and the right side actuator in fluid communication.

16. The hydraulic system set forth in claim 15, wherein the tie rod control valve is positioned proximate to both the right side actuator and the left side actuator.

17. The hydraulic system set forth in claim 15, wherein the fluidic tie rod fluid circuit defines a circuit volume having an actuator side volume disposed between the left side actuator, the right side actuator, and the tie rod control valve, and a tank side volume disposed between the tie rod control valve and the rear steering control valve, with the actuator side volume being less than the tank side volume.

* * * * *